(12) United States Patent
Sanuki et al.

(10) Patent No.: US 7,727,050 B2
(45) Date of Patent: Jun. 1, 2010

(54) VIBRATING DEVICE

(75) Inventors: Mitsuhiro Sanuki, Hamamatsu (JP);
Toshihiro Nishiguchi, Hamamatsu (JP);
Isao Moriguchi, Hamamatsu (JP);
Yasuyoshi Hirooka, Hamamatsu (JP);
Takeshi Matsuura, Hamamatsu (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 11/573,970

(22) PCT Filed: Aug. 22, 2005

(86) PCT No.: PCT/JP2005/015231

§ 371 (c)(1),
(2), (4) Date: Feb. 20, 2007

(87) PCT Pub. No.: WO2006/022236

PCT Pub. Date: Mar. 2, 2006

(65) Prior Publication Data

US 2008/0318501 A1    Dec. 25, 2008

(30) Foreign Application Priority Data

Aug. 26, 2004  (JP) ............................. 2004-246554

(51) Int. Cl.
*B24B 49/00* (2006.01)
(52) U.S. Cl. .................. 451/11; 451/212; 451/366; 451/395; 451/910

(58) Field of Classification Search ............ 451/10, 451/11, 212, 213, 242, 246, 366, 392, 395, 451/398, 910
See application file for complete search history.

(56) References Cited

U.S. PATENT DOCUMENTS

| 4,369,603 | A | * | 1/1983 | Gebel et al. ............... 451/52 |
| 4,620,121 | A | * | 10/1986 | Mishiro ............... 310/323.18 |
| 5,165,205 | A | * | 11/1992 | Nakagawa et al. ......... 451/392 |
| 5,540,614 | A | * | 7/1996 | Poschl ...................... 451/165 |
| 6,287,183 | B1 | * | 9/2001 | Zhang et al. ............... 451/407 |

FOREIGN PATENT DOCUMENTS

JP      2003-080442      3/2003

* cited by examiner

*Primary Examiner*—Eileen P. Morgan
(74) *Attorney, Agent, or Firm*—Rankin, Hill & Clark LLP

(57) ABSTRACT

The object of the present invention is to enable efficient vibration processing by applying a sufficient displacement amount and response speed to an object to be vibrated. In grinding of an outer surface of a workpiece W, first and second supporting members are provided for supporting two opposed points of the workpiece, and first and second vibrators comprising a plurality of piezoelectric elements are arranged in blind holes formed in the center of the first and second supporting members. The first and second vibrators are activated with sine wave signals which differ in phase by 180 degrees so as to cause the first and second supporting members to expand and shrink in the back-and-forth direction. The displacement amount is amplified and the processing is performed. Also, the second supporting member can move back and forth toward the first supporting member.

7 Claims, 3 Drawing Sheets

VIBRATING DEVICE

TECHNICAL FIELD

The present invention relates to a vibrating device for vibrating a workpiece when processed.

BACKGROUND ART

Conventionally, there is known a technique in which cutting, drilling, pressing or the like is performed to a workpiece while a processing tool or the workpiece is vibrated. Specifically, there is a known dicing device in which complex vibration is applied to a blade for cutting a workpiece so as to prevent burrs or reduce blade abrasion (see Patent Document 1), and a vibration processing device in which processing accuracy or processing efficiency is improved by applying vibration to a press head from a motor via an non-concentric shaft (see Patent Document 2).

Patent Document 1: Japanese Patent Application Publication No. 2003-80442

Patent Document 2: Japanese Patent Application Publication No. H09-285896

Also, various kinds of vibrating devices using magnetostriction or electrostriction have been proposed as a means for generating vibration. For example, there is a known vibrating mechanism in the field of vibration testing machines, a micropiston or the like, in which piezoelectric elements are provided in the center and the end portions of a lever, and the lever is rotated in a state where the bearing of the lever is a center of rotation (see Patent Document 3). There is also known a seesaw vibrating device in the field of a cell phone vibrator or the like, in which a first piezoelectric element and a second piezoelectric element are provided in the bottom below the left and right sides of a bearing shaft of a seesaw plate, and these piezoelectric elements are activated in a reversed phase so as to vibrate the seesaw plate around the bearing shaft (see Patent Document 4).

Patent Document 3: Japanese Patent Application Publication No. H05-138128

Patent Document 4: Japanese Patent Application Publication No. 2004-25009

In order to improve the processing accuracy as well as the lifetime of the tool or the processing efficiency in the field of vibration processing, it is necessary to adjust vibration to be minute in which the displacement amount is around several microns, and improve the response characteristic by applying vibration at a high frequency. However, when vibration is applied to the blade or the press head of the processing tool as described in Patent Documents 1 and 2, it is impossible to achieve sufficient displacement amount or response characteristics in a case where the processing device has a certain amount of weight. Additionally, vibration or noise easily occurs in the processing device, and such vibration or noise becomes significant if the device has a certain amount of weight. Therefore, it is necessary to increase the rigidity of the whole device and take measures for sound insulation.

The object of the present invention is to enable efficient vibration processing by applying a sufficient displacement amount and response speed to an object to be vibrated without increasing rigidity of the processing device and taking measures for sound insulation.

DISCLOSURE OF THE INVENTION

In order to achieve the above object, according to the present invention, there is provided a vibrating device for vibrating a workpiece comprising a first supporting member and a second supporting member for supporting two opposed points of the workpiece, a moving means for moving at least one of the supporting members between a supporting position and a releasing position, a first vibrator and a second vibrator for applying vibration to the workpiece through the first supporting member and the second supporting member, and an activating means for vibrating the first vibrator and the second vibrator in a reversed phase.

By vibrating a workpiece instead of vibrating a processing tool, it is possible to prevent a processing device from generating vibration or noise. Also, by vibrating the first vibrator and the second vibrator in a reversed phase when vibration is applied to the workpiece from the first and second vibrator through the first and second supporting members which support two opposed points of the workpiece, it is possible to amplify the amplitude so as to achieve a sufficient amount of displacement, which makes it possible to perform efficient processing and improve the lifetime of the tool at the same time.

As the first and second supporting members, a clamping member for clamping two opposed points of a workpiece or a center member for supporting the center of a shaft-shaped workpiece may be used. Also, examples of the processing include cutting, grinding, boring or the like. As the vibrator, a magnetostriction element or an electrostriction element may be used.

According to the present invention, a piezoelectric element for generating vibration by using expansion and shrinkage of a material is used as the first and second vibrators.

By using the piezoelectric element, it is possible to construct a light and simple vibration generating mechanism, and also improve the response characteristics.

EFFECT OF THE INVENTION

According to the present invention, in vibrating processing, a workpiece is vibrated, and this vibration of the workpiece is performed through the first and second supporting members which support two opposed points of the workpiece by activating the first vibrator and the second vibrator in a reversed phase. Consequently, it is possible to perform the processing while the amplitude is amplified and a sufficient amount of displacement is achieved, so that the lifetime of the tool can be improved and efficient processing can be achieved. Also, if a piezoelectric element is used for the vibrators, it is possible to prevent noise, etc., from being generated and construct a light and simple vibration generating mechanism in addition to the improvement of the tool lifetime and the processing efficiency.

BEST MODE FOR CARRYING OUT THE INVENTION

Figure 1:
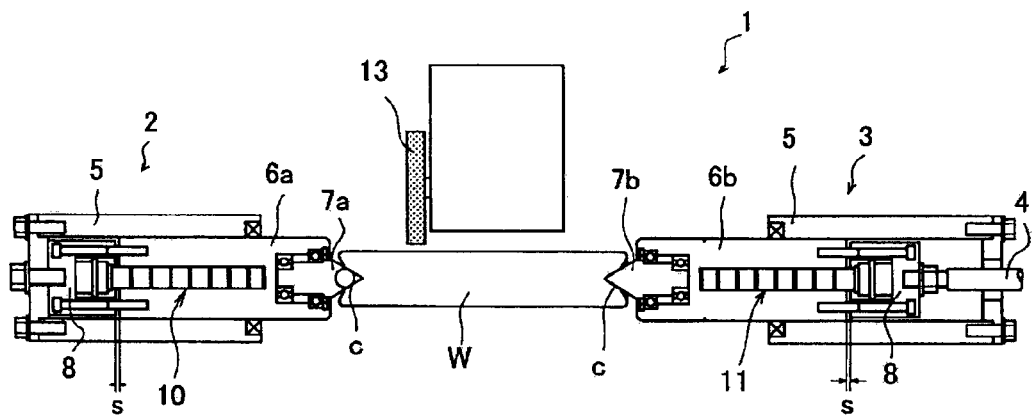
FIG. 1 is a view explaining an example in which the vibrating device of the present invention is applied to cylindrical grinding processing.
Figure 1:
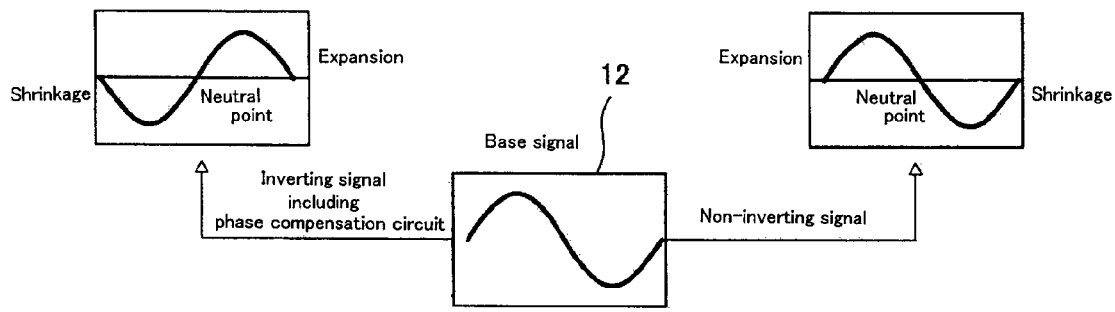
Figure 2:
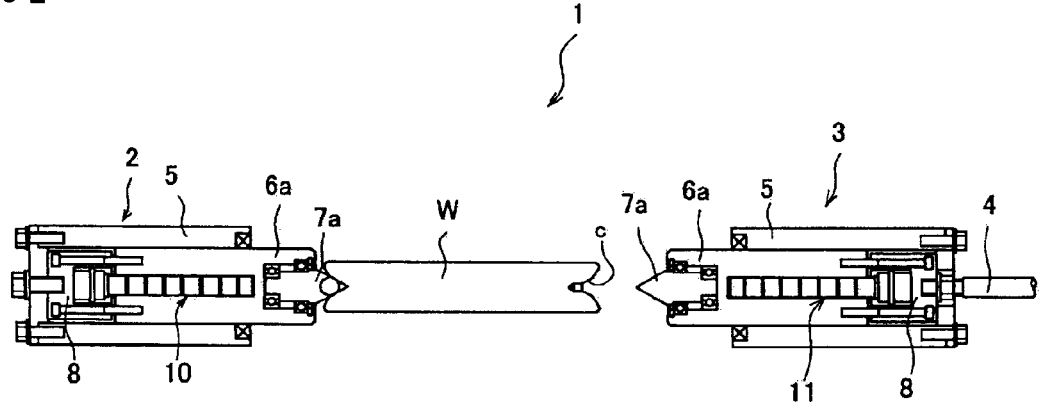
FIG. 2 is a view showing a state before a workpiece is supported.
Figure 3:
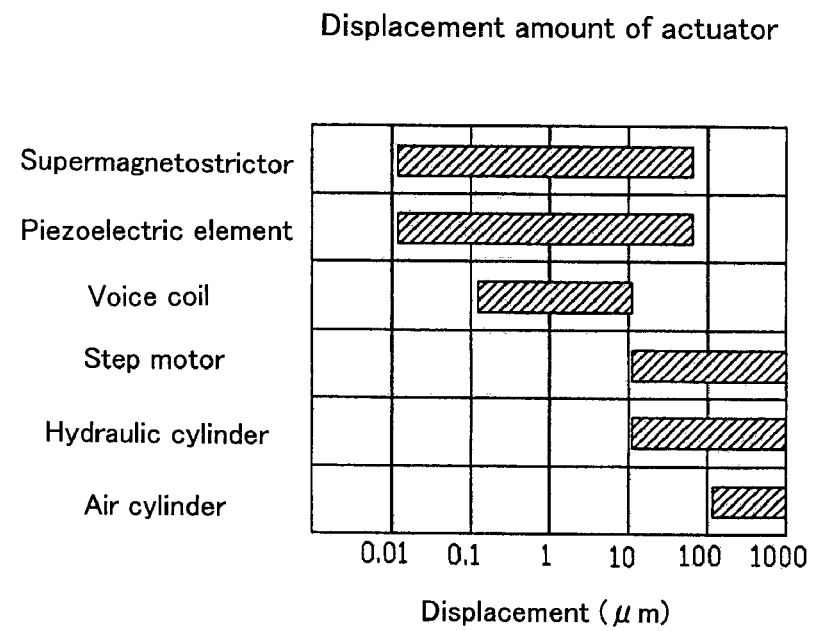
FIG. 3 shows comparison with regard to a displacement amount and response characteristics of various kinds of actuators for activating each vibrator.
Figure 3:
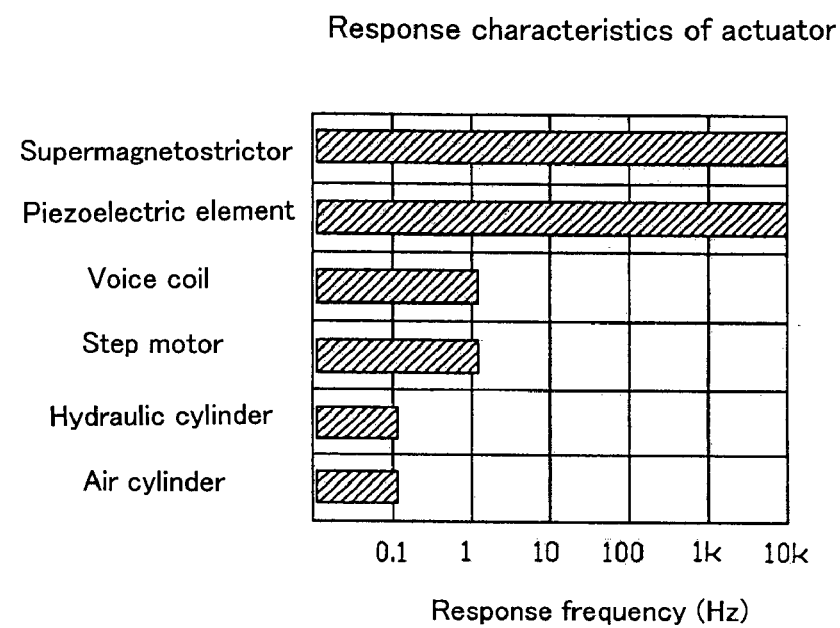
Figure 4:
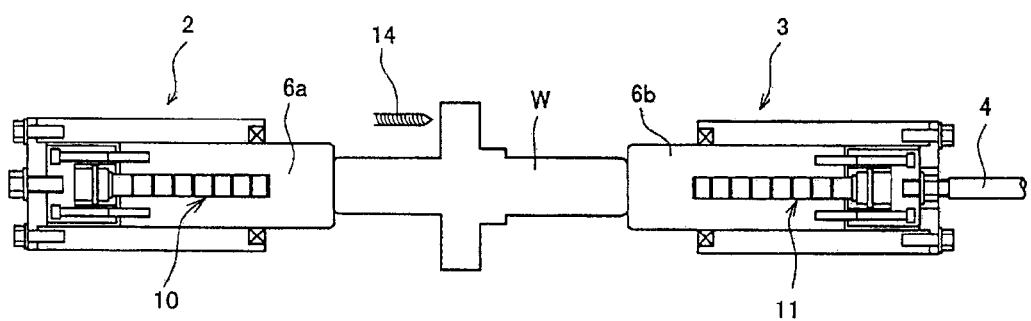
FIG. 4 is a view explaining another example in which the vibrating device of the present invention is applied to boring processing.

Embodiments of the invention will be described below on the basis of the accompanying drawings, in which FIG. 1 is a view explaining an example in which the vibrating device of the present invention is applied to cylindrical grinding processing, FIG. 2 is a view showing a state before a workpiece is supported, FIG. 3 shows comparison with regard to a displacement amount and response characteristics of various kinds of actuators, and FIG. 4 is a view explaining another example in which the vibrating device of the present invention is applied to boring processing.

In the vibrating device according to the present invention, vibration processing is performed to a workpiece while minute vibration is applied to the workpiece itself. With this, it is not required to increase the rigidity of the processing device and take measures for sound insulation, and it is possible to perform efficient processing by applying a sufficient amount of displacement and response speed to an object to be vibrated. In the embodiment shown in FIG. 1, the present invention is applied to grinding of an outer surface of a cylindrical workpiece W.

Specifically, as shown in FIG. 1, a grinding device 1 is provided with a pair of left and right tailstocks 2, 3 for supporting the cylindrical workpiece W, and first and second supporting members 6a, 6b installed in main body housings 5 of the tailstocks 2, 3. The second supporting member 6b can move back and forth toward the first supporting member 6a by a hydraulic cylinder 4 as a moving means. Centers 7a, 7b are provided in the end of the supporting members 6a, 6b, which are supported by a bearing in a rotatable manner. The centers 7a, 7b can be engaged with center holes C in the both ends of the cylindrical workpiece W.

Vibrator retaining members 8 are provided in the base ends of the first and second supporting members 6a, 6b, and blind holes are formed in the center of the base ends of the supporting members 6a, 6b. A plurality of piezoelectric elements having a substantially rectangular-parallelepiped shape and made of a piezoelectric material such as ceramic are arranged in the blind holes, which form a first vibrator 10 on the first supporting member 6a side and a second vibrator 11 on the second supporting member 6b side. The piezoelectric elements in the distal ends of the vibrators 10, 11 are retained by the vibrator retaining members 8.

The piezoelectric elements have a piezoelectric effect that they expand and shrink in the back-and-forth direction due to strain which is generated when potential difference is applied to the both ends. With this, it is possible to convert electrical energy into mechanical work.

Therefore, when activating electric force is applied to the piezoelectric elements, the first and second vibrators 10, 11 are caused to vibrate in the back-and-forth direction, so that the first and second supporting members 6a, 6b are also caused to vibrate in the back-and-forth direction. Spaces S are provided between the vibrator retaining members 8 and the first and second supporting members 6a, 6b so as to allow the first and second supporting members 6a, 6b to vibrate in the back-and-forth direction.

An activating means 12 for supplying electrical energy to the first and second vibrators 10, 11 is arranged to perform activation and control by supplying sine waves which differ in phase by 180 degrees (non-inverting signal and inverting signal) through a phase compensation circuit. With this, it is possible to amplify the amplitude in the axial direction and reduce the mass of the cylindrical workpiece W. It is also possible to stabilize the displacement of the vibration.

As for the structure of a processing tool 13, a grindstone to be rotated by a controlling means is possible, and the processing tool 13 is arranged to be able to contact the surface of the workpiece W.

In operation, the second supporting member 6b is advanced from the state shown in FIG. 2, and the center holes C are allowed to be supported by the centers 7a, 7b in the both ends of the cylindrical workpiece W. Next, the activating means 12 and the phase compensation circuit are activated and controlled so as to supply sine wave signals which differ in phase by 180 degrees to the piezoelectric elements of the first and second vibrators 10, 11, which causes the cylindrical workpiece W to start minute vibration in the axial direction. In this state, the processing tool 13 is brought into contact with the cylindrical workpiece W to grind the outer surface. In the conventional art, cutting is performed by relative slide generated in the rotation direction only. However, according to the present invention, relative slide is also generated in the axial direction so as to achieve grinding of high efficiency and reduce the load on the processing tool 13. Consequently, the lifetime of the tool can be improved.

As for a specific structure of the actuator for applying minute vibration to the first and second vibrators 10, 11, it is possible to employ an air cylinder, a hydraulic cylinder, a step motor, a voice coil, a magnetostrictor or the like as well as the piezoelectric element. FIG. 3 shows comparison of these actuators with respect to the amount of displacement and the response characteristics.

The results show that the response frequency of the piezoelectric element and the magnetostrictor is excellent but the displacement amount is insufficient. However, it turned out that the piezoelectric element and the magnetostrictor can be put into practical use by activating in a reversed phase with respect to each other in a case where an object is supported with two opposed points.

The piezoelectric element has various advantages such as that conversion efficiency is great when electrical energy is converted into mechanical work, the operation is at high speed, heat generation and electromagnetic noise are small, the size and the weight are small, and the maintenance is easy. Therefore, it is preferred that the piezoelectric element is applied to grinding, boring, and the like.

In the above-described embodiment, the present invention is applied to cylindrical grinding as an example of processing. However, examples of processing are not limited to this, and the present invention can also be applied to drill boring processing as shown in FIG. 4 or the like. In this instance, while both ends of the workpiece W are clamped by the first and second supporting members 6a and 6b, vibration of a reversed phase is applied from the first and second vibrators 10 and 11 and boring processing is performed with a drill 14.

The present invention is not limited to the above-described embodiments, and other various embodiments having a substantially similar structure and effect as the subject matter of the claims of the present application are within the scope of the present invention.

For example, a magnetostrictor may be used instead of a piezoelectric element for the first and second vibrators 10 and 11.

INDUSTRIAL APPLICABILITY

According to the present invention, when a workpiece is processed in a state where the workpiece is supported with two opposed points by the first and second supporting members, the workpiece is vibrated in a reversed phase by the first and second vibrators through the first and second supporting members. With this, efficient processing can be achieved and the lifetime of the tool can be improved. It is also possible to prevent drawbacks such as vibration of the processing tool or sound insulation. Further, if a piezoelectric element is used as the vibrator, the structure can be light and simple.

The invention claimed is:

1. A vibrating device for vibrating a workpiece comprising:
   a first supporting member and a second supporting member for supporting two opposed points of the workpiece;
   a moving means for moving at least one of the supporting members between a supporting position and a releasing position;
   a first vibrator and a second vibrator for applying vibration to the workpiece through the first supporting member and the second supporting member; and
   an activating means for supplying electrical energy in the form of a first sine wave to the first vibrator and a second sine wave to the second vibrator,
   wherein the first sine wave to the first vibrator differs in phase by 180 degrees from the second sine wave supplied to the second vibrator such that the first vibrator and second vibrator are vibrated in a reversed phase.

2. The vibrating device according to claim 1, wherein a piezoelectric element for generating vibration by using expansion and shrinkage of a material is used as the first and second vibrators.

3. The vibrating device according to claim 1, wherein the first supporting member is received within a first housing and the second supporting member is received within a second housing, and wherein the moving means is secured to one of the first and second housings and is operable to move the associated first and second supporting member toward and away from the other of the first and second supporting members while said one of the first and second housing remains stationary.

4. The vibrating device according to claim 3, wherein the moving means comprises a hydraulic cylinder that is operable to move the associated one of the first and second supporting members toward and away from the other of the first and second supporting members.

5. The vibrating device according to claim 1, wherein the first supporting member is received within a first housing and the second supporting member is received within a second housing, and wherein the first vibrator is secured to the first supporting member within the first housing and the second vibrator is secured to the second supporting member within the second housing, and wherein one of the first and second vibrators is disposed between the moving means and the associated first and second supporting member.

6. The vibrating device according to claim 5, wherein the moving means is secured to one of the first and second housings and is operable to move the associated first and second supporting member toward and away from the other of the first and second supporting members while said one of the first and second housing remains stationary.

7. The vibrating device according to claim 6, wherein the moving means comprises a hydraulic cylinder that is operable to move the associated one of the first and second supporting members toward and away from the other of the first and second supporting members.

\* \* \* \* \*